United States Patent Office 3,160,611
Patented Dec. 8, 1964

3,160,611
AMINO ALCOHOL MODIFIED POLYAMIDES
Wallace F. Runge, Terre Haute, Ind., assignor to Commercial Solvents Corporation, New York, N.Y., a corporation of Maryland
No Drawing. Filed June 10, 1960, Ser. No. 35,142
11 Claims. (Cl. 260—78)

My invention relates to new and useful polymeric compositions and a process for preparing same, and more particularly my invention relates to new and useful polymers which are the reaction products of polyamides having the following general formula:

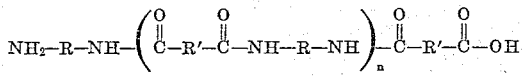

wherein R is an alkylene radical having 6 carbon atoms or a phenylene radical, R' is an alkylene radical having from 4 to 9 carbon atoms inclusive and $n$ is an integer ranging from 10 to 1,000 and amino alcohols having the following general formula:

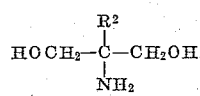

wherein $R^2$ is either hydroxyalkyl, alkyl or hydrogen.

I have now discovered new compositions which adhere especially strongly to materials such as steel, glass, etc., and which are useful in laminating layers of products such as glass cloth. One suitable method of utilizing the compositions of my invention in laminating layers of glass cloth consists of uniformly applying the composition in the form of a melt to a glass cloth surface and before solidification of the composition occurs applying a second glass cloth to the treated surface. This process can be continued to produce a product of any desired thickness or having any desired number of layers.

The new compositions of my invention can be prepared by interacting polyamides having the following general formula:

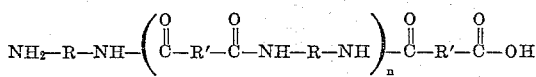

wherein R is an alkylene radical having 6 carbon atoms or a phenylene radical, R' is an alkylene radical having from 4 to 9 carbon atoms inclusive and $n$ is an integer ranging from 10 to 1,000 with an amino alcohol having the following general formula:

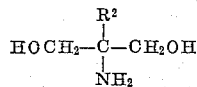

wherein $R^2$ is either hydroxyalkyl, alkyl or hydrogen in molar ratios of from about 200 to 10 of the polyamide to 1 of the amino alcohol at temperatures above 170° C. but below temperatures at which substantial decomposition of the reaction product and the reactants take place. I prefer, in preparing the compositions of my invention, to first thoroughly mix the polyamide and amino alcohol in molar ratios of from about 200 to 10 of the polyamide to 1 of the amino alcohol. I then heat the mixture at temperatures above 170° C. but below the temperature at which substantial decomposition of the reaction products and the reactants take place. After the reaction is complete, I allow the reaction product to cool; and upon cooling I remove it from the reaction vessel.

Ordinarily, at temperatures below 200° C. the reaction proceeds rather slowly, while temperatures in excess of 300° C. give some decomposition of reactants. Generally, temperatures ranging from about 225° to about 280° C. are preferred.

My compounds can be prepared at atmospheric pressure; however, reduced pressures such as about 200 mm. can also be utilized.

Included among the polyamides which are operative in my invention are nylon 6, 6, a polyamide formed from the interaction of adipic acid and hexamethylene diamine; nylon 6, 10, a polyamide formed from the interaction of sebacic acid and hexamethylene diamine, Oronite, a polyamide formed from the reaction of adipic acid and p-phenylene diamine, etc., and the like. Included among the amino alcohols which are operative in my invention are tris-(hydroxymethyl)aminomethane, 2-amino-2-methyl-1,3-propanediol, 2-amino-2-ethyl-1,3-propanediol, 2-amino-1,3-propanediol, etc., and the like.

The molar ratios of the reactants are critical in producing a product strongly adhesive to glass and other products. Glass adhesion is observed when molar ratios as high as 200 of polyamide to 1 of amino alcohol are employed. Glass adhesion is also observed when molar ratios as low as 10 of polyamide to 1 of amino alcohol are employed. Products having maximum adherence however, are prepared using molar ratios of polyamide to amino alcohol of from about 50 to 1 to about 25 to 1 respectively.

The new compositions of my invention are hard, solid materials. They are soluble in formic acid, phenol, and m-cresol but are insoluble in water and in ethyl alcohol.

The following specific examples are offered to illustrate my invention; and it is not intended that my invention be limited to materials. They are soluble in formic acid, phenol, and m-cresol but are insoluble in water and in ethyl alcohol.

The following specific examples are offered to illustrate my invention; and it is not intended that my invention be limited to the specific amounts, proportions, and procedures set forth therein.

Example I

In a 100 cc. glass Carius tube were mixed 65 grams of nylon 6, 11, a polyamide formed from the reaction of hendecanoic acid and hexamethylene diamine and 3.0 grams tris(hydroxymethyl)aminomethane at a temperature of about 85° C. This mixture was then placed in a Carius furnace, preheated to a temperature of between 240° and 280° C. and left for a period of 16 hours at this temperature. At the end of the 16-hour period the product was removed from the furnace and allowed to cool to room temperature. Upon cooling to approximately 50° C. the Carius tube began to shatter and shattering continued until the temperature of the product reached room temperature. Separation of the shattered glass from the product was extremely difficult due to the strong adhesive properties of the product.

Example II

Essentially the same procedure was followed as described under Example I with the exception that 60 grams of nylon 6, 6, a polyamide prepared from adipic acid and hexamethylene diamine and 2.0 grams of tris(hydroxymethyl)aminomethane were used. Upon cooling to approximately 50° C. the Carius tube began to shatter, and shattering continued until the temperature of the product reached room temperature.

Example III

Essentially the same procedure was followed as described under Example I with the exception that 50 grams of nylon 6,10, a polyamide prepared from sebacic acid and hexamethylene diamine and 2.0 grams of tris(hydroxymethyl)aminomethane were used. Upon cooling to approximately 50° C. the Carius tube began to shatter, and shattering continued until the temperature of the product reached room temperature. Separation of the shattered glass from the product was extremely difficult due to the strong adhesive properties of the product.

Now having described my invention, what I claim is:

1. A process for the preparation of modified nylon polymers which comprises interacting a polyamide selected from the group consisting of polyamides having the following general formula:

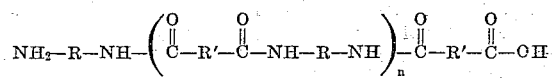

wherein R is a member selected from the group consisting of an alkylene radical having 6 carbon atoms and a phenylene radical, wherein R' is an alkylene radical containing from 4 to 9 carbon atoms inclusive and $n$ is an integer ranging from 10 to 1,000 with an amino alcohol having the following general formula:

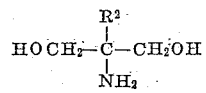

wherein $R^2$ is a member selected from the group consisting of hydroxyalkyl, alkyl and hydrogen in molar ratios of the polyamide to the amino alcohol of from about 200 to 1 to about 10 to 1 and at temperatures above 170° C. but below temperatures causing any substantial decomposition of the reaction product and the reactants.

2. The process of claim 1 wherein the temperature ranges from about 225° C. to about 280° C. and the molar ratios of polyamide to amino alcohol are from about 50 to 1 to about 25 to 1.

3. The process of claim 1 wherein the temperature ranges from about 225° C. to about 280° C.

4. The process of claim 1 wherein the amino alcohol is tris(hydroxymethyl)aminomethane.

5. The process of claim 1 wherein the amino alcohol is 2-amino-2-ethyl-1,3-propanediol.

6. The process of claim 1 wherein the amino alcohol is 2-amino-1,3-propanediol.

7. The process of claim 1 wherein the amino alcohol is 2-amino-2-methyl-1,3-propanediol.

8. As new compositions of matter modified nylon polymers obtained by a process which comprises interacting a polyamide selected from the group consisting of polyamides having the following general formula:

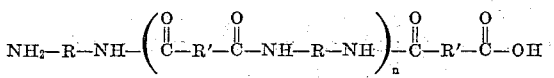

wherein R is a member selected from the group consisting of an alkylene radical containing 6 carbon atoms, a phenylene radical and R' is an alkylene radical containing from 4 to 9 carbon atoms inclusive and $n$ is an integer ranging from 10 to 1,000 with an amino alcohol having the following general formula:

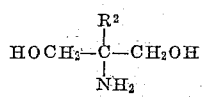

wherein $R^2$ is a member selected from the group consisting of hydroxyalkyl, alkyl and hydrogen in molar ratios of the polyamide to the amino alcohol of from about 200 to 1 to about 10 to 1 and at temperatures above 170° C. but below temperatures causing any substantial decomposition of the polymeric product and the reactants.

9. As new compositions of matter solid modified nylon polymers obtained by a process which comprises interacting polyhexamethylene adipamide with an amino alcohol having the following general formula:

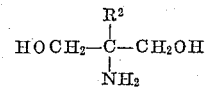

wherein $R^2$ is a member selected from the group consisting of hydroxyalkyl, alkyl and hydrogen in molar ratios of the polyamide to the amino alcohol of from about 200 to 1 to about 10 to 1 and at temperatures above 170° C. but below temperatures causing any substantial decomposition of the polymeric product and the reactants.

10. As new compositions of matter solid modified nylon polymers obtained by a process which comprises interacting a polyhexamethylene sebacamide with an amino alcohol having the following general formula:

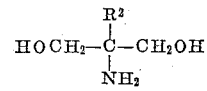

wherein $R^2$ is a member selected from the group consisting of hydroxyalkyl, alkyl and hydrogen in molar ratios of the polyamide to the amino alcohol of from about 200 to 1 to about 10 to 1 and at temperatures above 170° C. but below temperatures causing any substantial decomposition of the polymeric product and the reactants.

11. As new compositions of matter solid modified nylon polymers obtained by a process which comprises interacting a polyamide formed from the reaction of adipic acid and p-phenylene diamine with an amino alcohol having the following general formula:

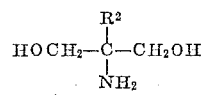

wherein $R^2$ is a member selected from the group consisting of hydroxyalkyl, alkyl and hydrogen in molar ratios of the polyamide to the amino alcohol of from about 200 to 1 to about 10 to 1 and at temperatures above 170° C. but below temperatures causing any substantial decomposition of the polymeric product and the reactants.

References Cited in the file of this patent

UNITED STATES PATENTS

| | | |
|---|---|---|
| 2,456,271 | Graham | Dec. 14, 1948 |
| 2,526,078 | Kropa | Oct. 17, 1950 |